June 17, 1924.

W. T. MOHLER

PHOTOGRAPHIC ENLARGING APPARATUS

Filed Jan. 17, 1922    2 Sheets-Sheet 2

Inventor
William T. Mohler

Patented June 17, 1924.

1,498,472

UNITED STATES PATENT OFFICE.

WILLIAM T. MOHLER, OF FREMONT, NEBRASKA.

PHOTOGRAPHIC ENLARGING APPARATUS.

Application filed January 17, 1922. Serial No. 529,881.

*To all whom it may concern:*

Be it known that WILLIAM T. MOHLER, citizen of the United States, residing at Fremont, in the county of Dodge and State of Nebraska, has invented certain new and useful Improvements in Photographic Enlarging Apparatus, of which the following is a specification, reference being had therein to the accompanying drawings.

The invention relates to photographic enlarging machines, and has for its object to provide a device of this character wherein the focusing of the machine is automatically accomplished through the movement of the cam during the vertical adjustment or positioning of the enlarging camera.

A further object is to provide a photographic enlarging apparatus comprising a vertically disposed standard, a vertically movable carriage carried thereby and moved upwardly or downwardly by an endless chain passing over sprockets, one of which sprockets is provided with a crank. Also to provide the vertically disposed standard with a rack, which rack meshes with a gear of a gear train carried by the carriage, said gear train actuating a cam cooperating with vertically movable means whereby the focus of the camera is varied according to the position of the carriage on the standard.

A further object is to provide the chains with adjustable counterweights for counterweighting the carriage.

With the above and other objects in view the invention resides in the combination and arrangement of parts as hereinafter set forth shown in the drawings, described and claimed, it being understood that changes in the precise embodiment of the invention may be made within the scope of what is claimed without departing from the spirit of the invention.

In the drawings:—

Figure 1:
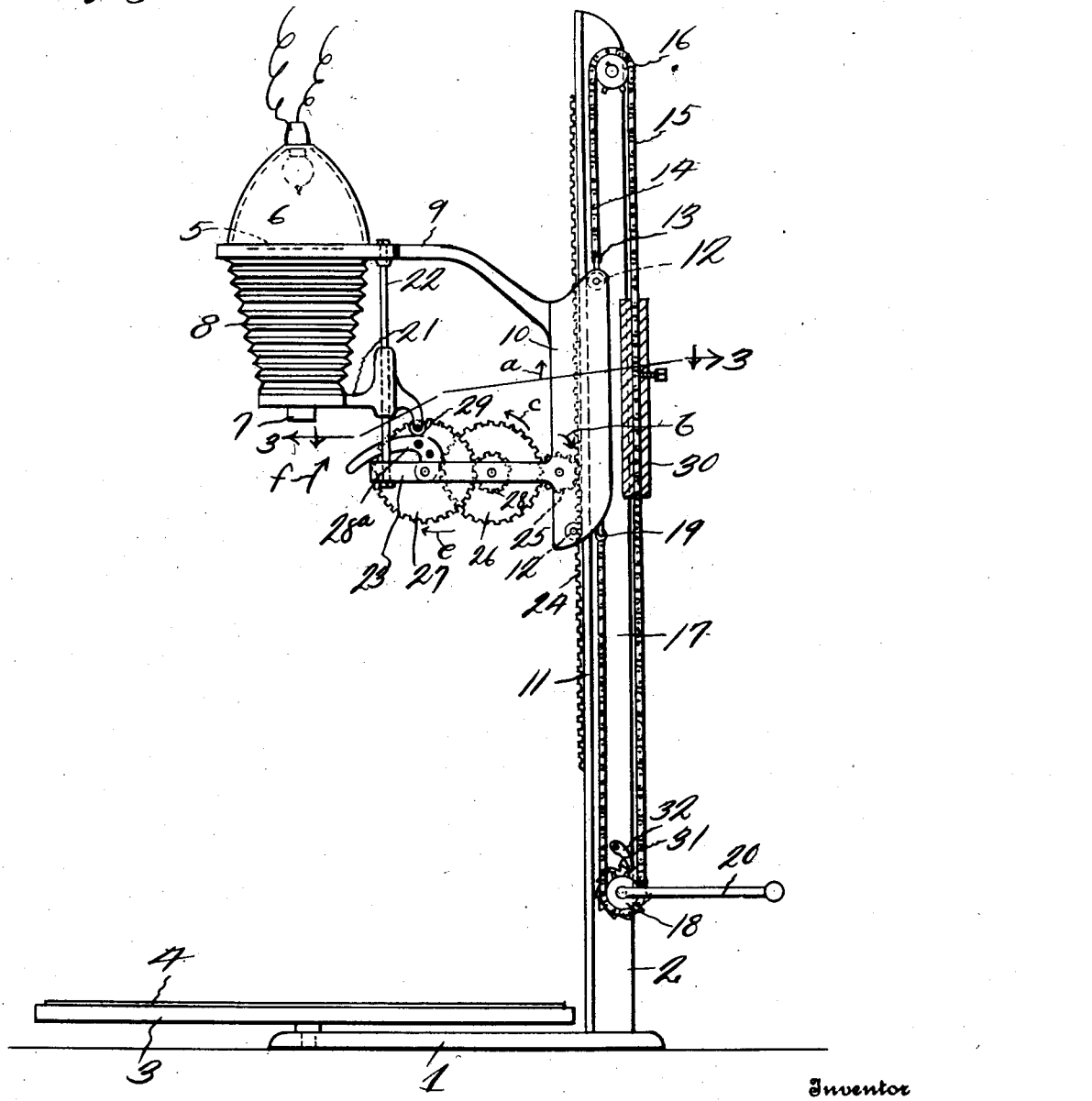
Figure 1 is a side elevation of the machine.
Figure 2:
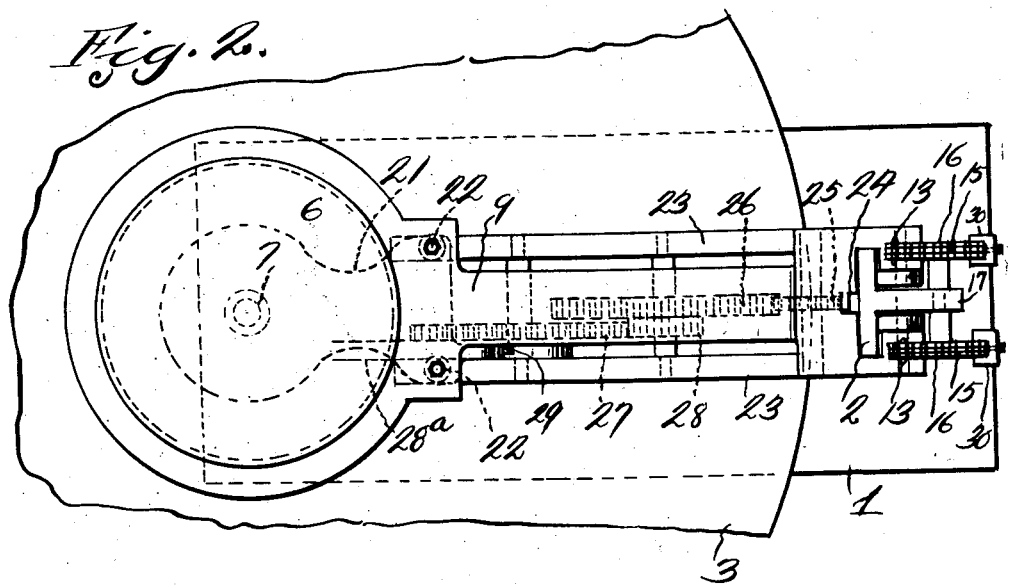
Figure 2 is a top plan view of the machine.
Figure 3:
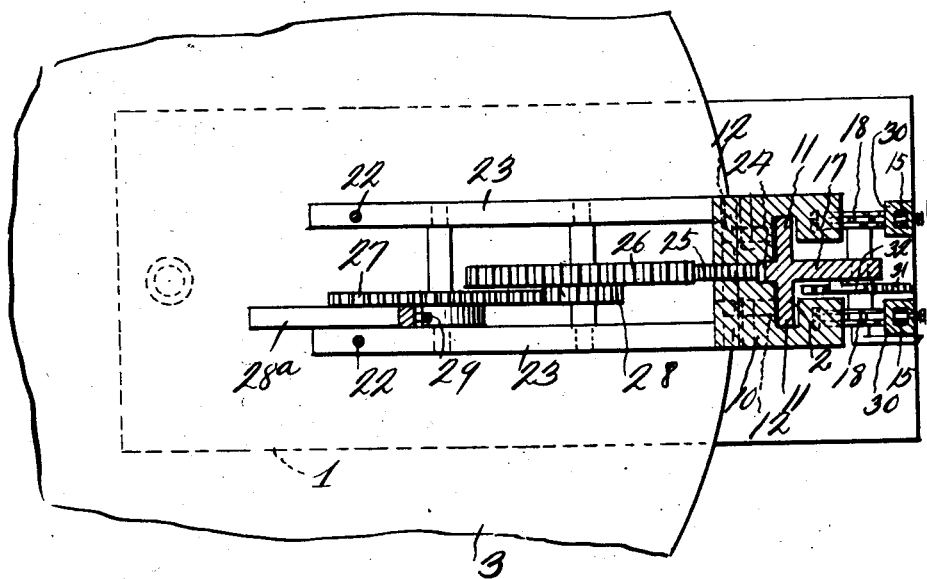
Figure 3 is a horizontal sectional view through the device taken on line 3—3 of Figure 1.

Referring to the drawings, the numeral 1 designates the base of the machine, and 2 the vertically disposed standard T-shaped in horizontal cross section. The base 1 is provided with a platform 3 on which platform a sheet of photographic paper 4 is disposed, and on which sheet an enlarged vision from the plate 5 is projected from the enlarging camera 6 through the lens 7. During an enlarging operation it is necessary to properly focus the lens 7 by a movement of the bellows 8, according to the size of the enlargement and according to the distance of the plate 5 from the sensitized papers 4. To accomplish the above results simultaneously, the camera 6 is mounted on a horizontally disposed arm 9 of a carriage 10, which carriage is vertically movable on the flanges 11 of the T-shaped standard 2, and is guided thereon by anti-frictional bearings 12. The carriage 10 has connected thereto at 13, the ends 14 of sprocket chains 15. The sprocket chains 15 extend upwardly and over sprockets 16 carried by the rearwardly extending flange 17 of the standard 2, and thence downwardly over sprockets 18, and upwardly and have their ends connected at 19 to the lower end of the carriage 10. It will be seen that when the crank handle 20 is rotated by the operator, that the carriage 10 will be moved upwardly or downwardly, thereby positioning the enlarging camera 6 at various elevations above the photographic paper 4.

The bellows 8 of the enlarging camera 6 is provided with a horizontally disposed member 21, which is slidably mounted on vertically disposed guide rods 22, which rods are braced at their lower ends by passing through spaced parallel arms 23 extending outwardly from a carriage 10. When the enlarging camera 6 is moved upwardly, it is necessary for the bellows to be collapsed for properly focusing the lens 7, and to accomplish this result simultaneously and automatically with the upward movement of the carriage 10 in the direction of the arrow *a*, and to also provide a fine focusing, a rack 24 is provided on the inner face of the standard 2, which rack has meshing therewith a gear 25, which rotates in the direction of the arrow *b*. The gear 25 is carried by the carriage 10 and is rotated in the direction of the arrow *b* on an upward movement of the carriage 10. Rotatably mounted between the arms 23 is a large gear 26 which is rotated in the direction of the arrow *c* when the gear 25 rotates in the direction of the arrow *b* and rotates a gear 27 in the direction of the arrow *e* through the medium of the small gear 28. By forming the gear train as above described from small and large gears, it will be seen that the rotation of the gear 27 will be reduced in speed, thereby allowing a fine focus, as the focusing varies in range in relation to the height of the carriage 10. To impart the movement of the gear 27 to the vertically movable member 21, the gear 27 is provided with a cam 28ª, which is engaged by a roller 29 carried by the member 21. The cam moves upwardly in the direction of the arrow $f$ in the operation above described and consequently causes the bellows 8 to be collapsed for a long focus, the distance varying according to the elevation of the carriage 10, and consequently the size of the enlarged object is varied. Upon a downward movement of the carriage 10, the above operation is reversed and the cam 28ª moves downwardly in a direction reversed to the arrow $f$, thereby shortening the focus by extending the bellows 8 downwardly.

The chains 15 may be provided with counterweights 30 which counterweight the carriage 10 and allow the same to be held in raised positions. However if so desired a cooperating ratchet 31 and dog 32 may be provided on the sprocket 18 and flange 17, respectively of the standard 2.

From the above it will be seen that a photographic enlarging machine is provided, wherein upon a raising of the enlarging camera, the focusing of the camera will simultaneously and automatically take place, thereby allowing the operator to devote his attention entirely to placing the sensitized paper and raising the camera to the proper elevation which will automatically properly focus the camera.

The invention having been set forth what is claimed as new and useful is:—

1. A photographic enlarging machine comprising a base, a standard carried by said base, a carriage vertically movable on the standard, means for moving said carriage vertically, a camera carried by the carriage, a bellows carried by the camera, a member carried by the lower end of the bellows, a lens carried by the lower end of the bellows, said member carried by the lower end of the bellows being vertically guidable, a rack carried by the standard, a gear train in connection with said rack and means actuated by the gear train whereby upon a movement of the carriage the member carried by the bellows will be automatically moved and the lens focused.

2. The combination with a photographic enlarging machine comprising a vertically disposed standard, a carriage vertically movable on the standard, means for moving said carriage on the standard, an enlarging camera carried by the carriage and provided with a bellows having a lens at its lower end, a gear train carried by the carriage, said gear train being connected to a rack carried by the standard, a cam movable by said gear train and a member carried by the lower end of the bellows with which the cam cooperates.

3. The combination with a photographic enlarging apparatus comprising a vertically movable carriage movable on a standard and a camera having a bellows and lens carried by the carriage, of means for automatically focusing the lens upon a movement of the carriage, said means comprising a gear train cooperating with a rack carried by the standard, and a cam actuated by the gear train and cooperating with the bellows.

In testimony whereof I hereunto affix my signature.

WILLIAM T. MOHLER.